United States Patent [19]

Folik

[11] 4,045,697

[45] Aug. 30, 1977

[54] PLASTIC CLOSURE CAP FOR ELECTRIC MOTOR

[75] Inventor: Joseph C. Folik, Hanover Park, Ill.

[73] Assignee: Molon Motor & Coil Corporation, Rolling Meadows, Ill.

[21] Appl. No.: 492,543

[22] Filed: July 29, 1974

[51] Int. Cl.² ............................................. H02K 5/00
[52] U.S. Cl. .................................................. 310/89
[58] Field of Search ..... 310/89, 90, 40 MM, 162-164, 310/43, 91, 191, 201

[56] References Cited

U.S. PATENT DOCUMENTS

| | | | |
|---|---|---|---|
| 2,701,845 | 2/1955 | Gallagher | 310/164 |
| 2,794,137 | 5/1957 | Faus | 310/164 |
| 3,032,666 | 5/1962 | Papst | 310/91 |
| 3,209,185 | 9/1965 | Draper | 310/162 |
| 3,310,696 | 3/1967 | Jullien-Davin | 310/164 |
| 3,387,153 | 6/1968 | Grad | 310/90 |
| 3,624,440 | 11/1971 | Latussek | 310/162 |
| 3,720,852 | 3/1973 | Vieweg | 310/40 MM |
| 3,899,701 | 8/1975 | Ogawa | 310/40 MM |
| 3,906,264 | 9/1975 | Kuwako | 310/162 |

Primary Examiner—R. Skudy
Attorney, Agent, or Firm—Charles F. Pigott, Jr.

[57] ABSTRACT

A plastic closure cap for an electric motor comprising a central disc portion for closing one end of a stator cavity of the motor, a peripheral rim portion which engages the periphery of the stator to mechanically secure the closure cap thereto, and a thrust surface portion for limiting end play or travel of the motor shaft and axially locating the same.

6 Claims, 4 Drawing Figures

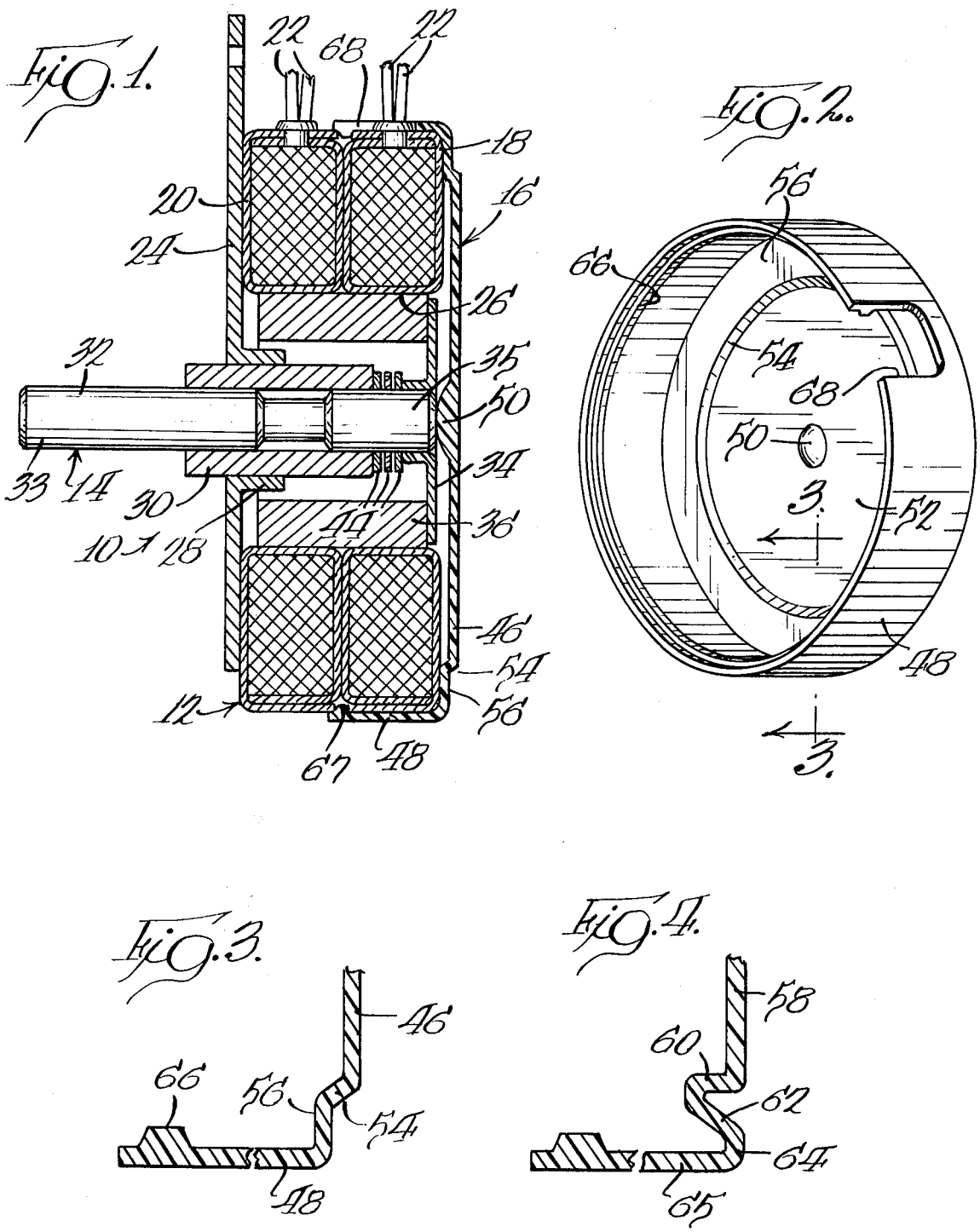

PLASTIC CLOSURE CAP FOR ELECTRIC MOTOR

BRIEF SUMMARY OF THE INVENTION

This invention relates to a fractional horsepower electric motor and more particularly to a plastic closure cap for such motor.

Typically, a prior art electric motor of the fractional horsepower type, such as shown in U.S. Pat. No. 3,633,055, includes a stator housing forming a stator cavity in which a rotor having a shaft is rotatably mounted by a sleeve bearing fixedly secured in the stator housing. Axial movement of the shaft is normally limited by means fixed on the shaft which abuts against opposite ends of the sleeve bearing. Unless the parts of the motor are manufactured to very close tolerances and carefully assembled, there is usually some end play in the shaft, which in many motor applications is undesirable. Since fractional horsepower motors are manufactured in large quantities for various applications, only some of which require limited end play, it is prohibitively expensive to limit the amount of end play by the above-mentioned known technique.

Further, an electric motor, particularly of the permanent magnet type, requires absence of foreign particles in the stator cavity. In the prior art, one method of preventing entrance of such particles was to close the end of the stator with a metal plate adhesively secured to the stator housing. However, such a construction is not entirely reliable in all applications as the adhesive may tend to dry up. Moreover, such a procedure is relatively expensive due to the high cost of forming metal parts, and the additional assembly step of applying the adhesive.

The plastic closure cap of the present invention overcomes the foregoing disadvantages and provides an inexpensive closure, mechanically secured to the housing, and capable of axially locating the motor shaft and limiting shaft end play. The closure cap of the present invention comprises a central disc made of a plastic material having a peripheral rim which is mechanically engaged with the motor housing, and a thrust surface for axially locating the motor shaft and limiting shaft end play.

Other advantages of the plastic closure cap of the present invention will become apparent from the following description and accompanying figures of the drawings.

BRIEF DESCRIPTION OF THE DRAWINGS

FIG. 1 is a cross-sectional view of one embodiment of the plastic closure cap of the present invention installed on an electric motor;

FIG. 2 is a perspective view of the closure shown in FIG. 1;

FIG. 3 is an enlarged fragmentary cross-sectional view taken substantially along line 3—3 of FIG. 2; and FIG. 4 is a view similar to FIG. 3 but showing an alternative construction for the closure.

DESCRIPTION OF THE PREFERRED EMBODIMENTS

Referring to FIG. 1, an electric motor 10 of the fractional horsepower, permanent magnet type, comprises a stator assembly 12, a rotor assembly 14, and a plastic closure cap 16 constructed in accordance with the present invention.

In more detail, the stator 12 includes a pair of annular stator housings 18 and 20 containing field windings and each having a pair of electric wires 22 extending therefrom. The housing 18 is secured to the housing 20 which in turn is secured to a mounting or base plate 24 to form a stator cavity 26 in which the rotor 14 rotates. An axially inwardly bent sleeve portion 28 of the base plate 24 forms a support for an axially extending sleeve bearing 30.

The rotor 14 has an elongated shaft 32 which is rotatably supported in the bearing 30, one end 33 of the shaft extending from the stator to receive various appliances, such as fans, pulleys, etc., and the other end 35 having a sheet metal hub 34 pressed thereon to which a tubular ceramic magnet 36 is fixedly secured. A plurality of washers or shims 44 are located between the hub 34 and the inner end of the bearing 30 to axially locate the shaft 32 in one direction. The plastic closure cap 16 of the present invention closes the open end of the cavity 26 to prevent foreign materials from contaminating the ceramic magnet 36, the stator windings or the bearing surfaces etc., and in addition it axially locates the shaft 32 in the opposite axial direction.

The closure cap 16 is made of a plastic material such as polypropylene by an inexpensive injection process, and comprises a central disc portion 46, a peripheral lip or rim 48 which extends over the outer periphery of the stator housing 18, and a thrust surface 50 located in abutting relation to the end 35 of the shaft 32 to axially locate the shaft and limit end play.

Preferably, the thrust surface 50 is generally dome-shaped having a spherical radius about three times that of the radius of the shaft, a 0.37 inch spherical radius being used for a ¼ inch diameter shaft. The thrust surface 50 is formed integral with the closure 16 and therefore the plastic material used must have good hardness and wear characteristics, as does polypropylene.

The central disc portion 46 acts somewhat like a spring to bias the shaft 32 toward the left as shown in FIG. 1. As shown in FIG. 3, the central disc portion 46 has a somewhat stepped cross-section adjacent the rim 48 to provide for flexure of the disc. Thus, the disc portion 46 extends radially outwardly, then axially away from the portion 46 as indicated at 54, then radially outwardly as indicated at 56 to join the rim 48. An alternative cross-sectional configuration for the closure cap is shown in FIG. 4 where a central disc 58 extends first radially outwardly, then axially away from the portion 58 as indicated at 60, then back angularly and outwardly as indicated at 62, and finally radially outwardly as indicated at 64 to join a rim 65.

The rim 48 must securely hold the closure cap 16 on the stator housing 18 since the closure cap may have an end thrust force imposed on it by the shaft 32. Thus, the rim 48 mechanically connects the closure cap to the housing 18 by an integrally formed, inwardly extending projection 66 which extends into a circumferential groove 67 on the stator housing. A cutout 68 is provided in the rim for passage of the wires 22. The closure cap 16 is easily installed on the motor 10 simply by snapping the cap in place, being sure that the projection 66 fits over the end of the stator housing 18 into the groove 67 and that the wires 22 extend through the cutout 68.

While in the embodiments described the plastic closure cap 16 is held on the stator by an inwardly depending projection 66 on the rim 48, the projection securing the closure to the motor may extend in a different manner or cooperate with a different portion of the motor. Also, while the thrust surface 50 illustrated is dome-shaped, a flat surface contacting the end of the shaft may also be used. Further, it will be appreciated that plastic materials with mechanical and physical properties similar to those of polypropylene may be used for the closure cap.

What is claimed is:

1. In an electric motor including a stator housing forming a stator cavity closed at one end, a bearing mounted in the stator housing, and a rotor having a shaft rotatably mounted in the bearing, the improvement comprising, in combination:
    a snap-on resilient plastic closure for the other end of the stator cavity, said closure including a central disc portion closing the stator cavity;
    a peripheral rim portion extending from said central disc portion for securing said closure to the motor, said peripheral rim portion carrying a radially-inwardly extending projection for engaging a portion of the motor to secure mechanically the closure thereto, said peripheral rim portion and projection being resilient whereby said closure may be slid over a portion of the stator housing and snapped in place;
    a thrust surface portion carried by said central disc portion and located on said central disc portion along the axis of the motor shaft, said thrust surface portion abutting the end of the motor shaft to locate the shaft axially and to limit end play or travel of the shaft.

2. Apparatus as defined in claim 1, wherein said thrust surface portion is integral with said central disc portion.

3. Apparatus as defined in claim 2, wherein said thrust surface portion is dome-shaped.

4. Apparatus as defined in claim 3, wherein said thrust surface portion has a radius approximately three times that of the motor shaft.

5. Apparatus as defined in claim 2 wherein said central disc portion biases said thrust surface portion into contact with the end of the shaft.

6. Apparatus as defined in claim 1, wherein said plastic closure is made of polypropylene plastic.

* * * * *